(12) United States Patent
Hemon et al.

(10) Patent No.: US 7,385,307 B2
(45) Date of Patent: Jun. 10, 2008

(54) DRIVE ARRANGEMENT FOR ACTIVATING A CAR SAFETY DEVICE ACTIVATION ELEMENT

(75) Inventors: Erwan Hemon, Goyrans (FR); Thierry Laplagne, Miremont (FR); Pierre Turpin, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 500 days.

(21) Appl. No.: 11/145,629

(22) Filed: Jun. 6, 2005

(65) Prior Publication Data

US 2005/0269879 A1      Dec. 8, 2005

(30) Foreign Application Priority Data

Jun. 4, 2004   (EP) ................................. 04013237

(51) Int. Cl.
*B60L 1/00*   (2006.01)
(52) U.S. Cl. ....................................... 307/9.1
(58) Field of Classification Search ................. 307/9.1
See application file for complete search history.

(56) References Cited

FOREIGN PATENT DOCUMENTS

| DE | 100 02 375 A1 | 4/2001 |
|---|---|---|
| WO | WO 00/30902 | 6/2000 |

*Primary Examiner*—Robert L. DeBeradinis

(57) ABSTRACT

A drive arrangement for activating a car safety device activation element, such as an air bag, comprises a drive circuit, which is coupled to the car safety device activation element. The drive circuit generates an activation signal which activates the car safety device. The arrangement includes a power supply transistor which is coupled in series with a power supply input of the drive circuit and an energy reservoir such as a capacitor. The arrangement further comprises control means which controls the supply voltage to the drive circuit by controlling the power supply transistor to operate in an active region to provide a voltage drop during activation of the car safety device activation element. Hence, a significant voltage drop and thus energy dissipation may be moved from the drive circuit to the power supply transistor. The drive circuit may therefore be reduced in size and the power supply transistor may be implemented in a cheap technology suitable for energy dissipation.

20 Claims, 2 Drawing Sheets

DRIVE ARRANGEMENT FOR ACTIVATING A CAR SAFETY DEVICE ACTIVATION ELEMENT

FIELD OF THE INVENTION

The invention relates to an integrated circuit, a drive arrangement and a method for activating a car safety device activation element and in particular, but not exclusively, to a drive arrangement for activating an air bag activation element.

BACKGROUND OF THE INVENTION

In recent years car, car design has increasingly focused on safety aspects including the performance of the car in crash situations.

In order to improve the safety of driver and passengers, modern cars comprise an increasing amount of safety devices. Many of these safety devices are aimed at improving safety during crashes. One such safety device is an air bag which is activated during a crash to protect the driver and passengers. Currently, cars typically comprise between one and eight airbags and it is likely that this number will increase in the future.

It is of the outmost importance that safety devices such as air bags are reliably activated in the event of a crash. Furthermore, it is important that the air bags are only activated during a crash, as an unintended activation of an air bag may disturb a driver and possibly cause an accident.

An air bag is typically activated by an activation element known as a squib. Different types of squibs exists but typically they are all activated by a short pulse of significant energy. For example, one type of squib comprises a very fast heating element which when applied the high energy pulse almost instantly generates a very high temperature. This ignites a small charge which sets of sodium azide resulting in the generation of a large volume of nitrogen gas filling the air bag.

In order to ensure a reliable air bag operation, it is critical that a suitable drive circuit is used for generating the activation pulse. FIG. 1 illustrates a simplified air bag activation circuit in accordance with prior art.

FIG. 1 illustrates a squib 101 coupled to a drive circuit 103. The drive circuit 103 is implemented in a single Application Specific Integrated Circuit (ASIC) and comprises functionality for generating the activation pulse which activates the squib 101. More specifically, the drive circuit 103 comprises a high side switch FET (Field Effect Transistor) 105 and a low side switch FET 107. During normal operation, where the air bag is passive, the high side FET 105 and the low side FET 107 are both in an off state and no current can flow through the squib. The use of two switch transistors in series provides increased reliability and failure prevention. Particularly, if either one of the switch FETs short circuits, this will not result in an activation of the air bag as the other switch FET will be in the off state.

The high side FET 105 is controlled by a high side control circuit 109 and the low side FET 107 is controlled by a low side control circuit 111. The low side control circuit 111 produces a signal which switches the low side FET 107 off during normal operation and on if the air bag is being activated. The high side control circuit 109 also controls the high side FET 105 to be off during normal operation and on during air bag activation. However, rather than simply switching the high side FET 105 fully on, the high side control circuit 109 also controls the signal to limit the current to the squib.

Typically, the current through the high side FET 105 is limited to around 2 A. Typically, the same energy supply is used for a plurality of air bags and the current limitation prevents that this energy supply is used up by a short circuit in one air bag. For example, during a crash, the upper squib end may be short circuited to ground. If the current through the high side FET 105 is not limited, the resulting current would become exceedingly high thereby quickly draining the energy supply and possibly preventing the activation of other air bags.

Typically, the drive circuit 103 is not directly connected to the energy supply. Rather, a power switch transistor known as a safing FET 113 is coupled in series with the drive circuit 103. The safing switch 113 is generally an external discrete component. The safing FET 113 provides further failure prevention by providing additional redundancy in the air bag activation operation.

Specifically the operation of the safing FET 113 is controlled by a control circuit 115 in response to different detector inputs than used for activating the drive circuit. Typically the safing FET 113 is controlled by a completely different processing unit based in a different crash detection algorithm and sensor input than for the drive circuit. Thus, the air bag is only activated if both redundant evaluations detect the occurrence of a crash in which case the high side FET 105 and the low side FET 107 of the drive circuit as well as the safing FET 113 are switched on. The safing FET 113 is operated as a simple on/off switch. In some applications several safing FETs are used to provide independent safety switches for different drive circuits. For example, each air bag may be provided with its own safing FET.

The safing FET 113 is coupled to a reverse flow blocking diode 117. It is an inherent feature of the manufacturing of FETs that a reverse parasitic diode 119, 121, 123 is connected between the source and drain.

The reverse flow blocking diode 117 is connected to a capacitor 125 which provides the energy supply to the activation circuit. The capacitor 125 is mounted in close proximity to the air bag activation circuit and ensures that energy may be provided to the air bag activation circuit even if the connection to the battery is broken during the crash. However as the capacitor 125 may be discharged, for example after the car has been switched of for a given duration, an electrical path exists from the upper end of the squib to ground through the capacitor 125 and the parasitic diodes 119, 121.

Accordingly, in the absence of the blocking diode 117, a short circuit resulting in a voltage being applied to the lower end of the squib would result in a current flowing through the squib and thereby activating the air bag. The blocking diode effectively breaks this path. The blocking diode may typically be common to a plurality of drive circuits.

A number of disadvantages are associated with the prior art arrangement of FIG. 1.

Firstly, the requirement for an external safing FET tends to increase the cost and complexity of the arrangement. Furthermore, the safing FET tends to be relatively bulky and as the FET is external to the drive circuit, it requires additional operations during manufacturing.

Furthermore, the prior art design results in a significant energy dissipation in the high side FET 105 which accordingly must be relatively large. Specifically, the energy stored in the reservoir capacitor is given by $$E = \frac{1}{2} C \cdot V^2$$

where C is the capacity of the capacitor and V is the voltage over the capacitor. Hence, in order to store sufficient energy to ensure that the squib is activated, while maintaining the size and cost of the capacitor acceptably low, it is required that the capacitor is charged to a relatively high voltage. Typically, the capacitor is charged to a voltage of around 35-36V.

During activation, the low side FET 107 is fully switched on resulting in a typical voltage drop of less than 2V.

Furthermore, the impedance of the switch is relatively low resulting in a typical voltage drop of less than 2V. The voltage drop over the blocking diode 117 is typically around 1V. Furthermore, the safing FET 113 is fully switched on during activation resulting in a typical voltage drop of around 1 V (the on resistance of the safing FET 113 is typically lower than that of the low side FET 107). Accordingly, during the current limiting operation of the high side FET 105, the voltage drop from drain to source is typically in the order of 30V. Typically the current is limited to around 2 A and the squib is fired in typically 2 ms. Therefore, the energy dissipation in the high side FET 105 during activation is around 30V·2 A·2 ms=120 mJ. This energy needs to be absorbed by the high side FET 105 without resulting in a thermal shutdown of the FET. In order to meet this energy requirement, it is necessary that the high side FET 105 is physically large.

However the requirement for a large FET has significant impact on the ASIC cost. Furthermore, as the required size depends on the energy absorption requirement, the design cannot take full advantage of the advances in ASIC manufacturing technology. For example, as improvements in lithography processing are achieved, smaller transistors can be formed resulting in smaller areas being required for circuits, This allows a higher integration and may allow more circuitry to be included in the same ASIC.

Another disadvantage of the prior art arrangement of FIG. 1 is that the blocking diode 117 introduces a significant voltage drop. This voltage drop results in an energy loss which must be compensated by an increase in the capacity of the capacitor. Furthermore, the blocking diode 117 is typically common for a plurality of air bags and thus carries a vary large current during air bag activation. For example the blocking diode 117 may be common for eight air bags thus conducting a typical current of up to 16 A during a crash. Accordingly, the blocking diode 117 is a relatively large discrete component requiring additional operations during assembly of the arrangement.

Hence, an improved system for activating a car safety device would be advantageous and in particular a system allowing for increased flexibility, increased performance, increased integration, improved reliability, reduced cost, reduced size and/or improved energy absorption or dissipation would be advantageous.

STATEMENT OF INVENTION

The present invention provides a drive arrangement for activating a car safety device activation element, an integrated circuit and a method of activating a car safety device as described in the accompanying claims. Accordingly, the present invention seeks to preferably mitigate, alleviate or eliminate one or more of the above-mentioned disadvantages, singly or in any combination.

BRIEF DESCRIPTION OF THE DRAWINGS

Exemplary embodiments of the present invention will now be described, with reference to the accompanying drawings, in which.

DESCRIPTION OF PREFERRED EMBODIMENTS

The following description focuses on an embodiment of the invention applicable to an activation element for a car safety device which specifically is an air bag activation device (frequently referred to as a squib). However, it will be appreciated that the invention is not limited to this application but may be applied to many other car safety devices including for example a safety belt pretension activation element. The described embodiment furthermore comprises Field Effect Transistors (FETs) but it will be appreciated that other transistor types such as bipolar transistors may alternatively or additionally be used.

Figure 2:
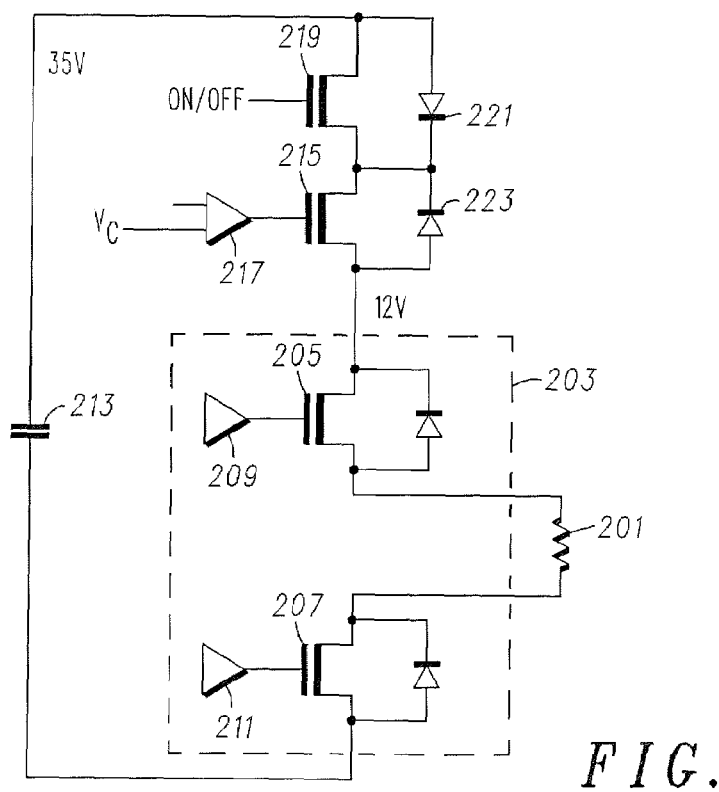
FIG. 2 illustrates a drive arrangement in accordance with an embodiment of the invention.

FIG. 2 illustrates a drive arrangement in accordance with an embodiment of the invention.

The drive arrangement is operable to generate an activation pulse which may activate the air bag activation element 201 henceforth referred to as the squib. The squib 201 is coupled to a drive circuit 203 comprising a high side switch FET (Field Effect Transistor) 205 and a low side switch FET 207. The high side FET 205 is controlled by a high side control circuit 209 and the low side FET 207 is controlled by a low side control circuit 211.

During normal operation where the air bag is passive, the high side FET 205 and the low side FET 207 are both in an off state. The low side FET 207 may be operated and designed in the same way as for the prior art arrangement of FIG. 1. However, the high side FET 205 is designed and dimensioned differently and operated in a different way than for the prior art arrangement of FIG. 1 as will be described later. However, similarly to the circuit of FIG. 1, the drive circuit of the described embodiment comprises current limiting means which limits the current for the squib 201 during activation. In particular the high side FET 205 is controlled by the low side control circuit 211 to limit the current through the high side FET 205 to around 2A.

In the current embodiment, the drive circuit 203 is powered from an energy reservoir in the form of a large capacitor 213. In other embodiments, other energy supplies may used, such as for example a battery. In the described embodiment, the capacitor 213 is coupled to the drive circuit 203 through a supply transistor 215, and in particular for the current embodiment the supply transistor 215 is connected to the high side FET 205 in a series connection by the drain of the high side FET 205 being connected to the source of the supply transistor 215. In the described embodiment, the supply transistor 215 is controlled by a supply controller 217. The supply transistor 215 is preferably, but not necessarily, at least partly used as a safing transistor.

The supply transistor 215 is coupled to the capacitor 213 through a blocking FET 219. In particular, the drain of the supply transistor 215 is coupled to the drain of the blocking FET 219 and the source of the blocking FET 219 is coupled to the capacitor 213.

During normal operation, all transistors of the drive arrangement are switched off and no current flows through the squib 201. When a crash is detected, the transistors switch to various on-states thereby allowing current to flow through the squib resulting in this being activated thereby causing the air bag to be activated. As an example, a typical squib may require an activation pulse of around 2 A for a duration of around 2 msec to be activated.

The operation of the drive arrangement during a squib activation will be described in more detail in the following.

When safety circuitry (not shown) detects that a vehicle carrying the air bag is involved in a crash, it controls the drive arrangement to activate the squib 201 and thus the air bag. The safety circuitry may particularly comprise one or more microcontrollers running suitable crash detection algorithms based on suitable sensor inputs. When a crash is detected, the microcontroller preferably outputs a signal that causes the low side control circuit 211 to generate a high gate voltage for the low side FET 207. The gate voltage is preferably sufficiently high to drive the low side FET 207 into the non-saturated operation region. In the non-saturated operating region, a FET operates similarly to a resistor having a low value, $R_{DS,ON}$, which is dependent on the voltage between the gate and source. Hence, the low side FET 207 is preferably driven to provide a very low substantially resistive load. The FET may specifically be considered to be in the non-saturated operation region when $$|V_{DS}| < |V_{GS} - V_T|$$

where $V_{DS}$ is the drain-source voltage, $V_{GS}$ is the gate-source voltage and $V_T$ is the threshold voltage of the transistor.

Similarly, the blocking FET 219 is switched on by preferably providing a sufficiently high gate voltage to drive it into the non-saturated region.

The safety circuitry also generates a signal causing the high side control circuit 209 to switch on the high side FET 205. However, in contrast to the low side FET 207 and the blocking FET 219, the high side FET 205 is not (necessarily) driven into the non-saturated region. Rather the high side FET 205 is driven in a current limitation mode wherein the current through the high side FET 205 and thus the squib 201 is limited to a suitable value which typically may be around 2 A. Typically, this will result in the high side FET 205 operating in an active operating range. For a FET, the active operating range may be defined as the region for which $$|V_{DS}| \geq |V_{GS} - V_T|$$

where $V_{DS}$ is the drain-source voltage, $V_{GS}$ is the gate-source voltage and $V_T$ is the threshold voltage for the transistor. For a FET the active operating range may sometimes be referred to as the saturated region or the linear region.

Thus, in contrast to the low side FET 207 and the blocking FET 219, the high side FET 205 is not fully switched on but is rather controlled by the high side control circuit 209 to provide a suitable current for the squib 201. It will be appreciated that any suitable method of measuring, estimating or determining the current through the squib 201 may be used. For example, the high side control circuit 209 may sense the voltage drop over a small resistor in series with the squib 201 as will be well known to a person skilled in the art.

Similarly, when the safety circuitry indicates that a crash is ongoing, the supply controller 217 switches on the supply FET 215 to allow current to flow through the transistor. However, in contrast to the circuit of FIG. 1, the supply controller 217 controls the supply FET 215 to operate in the active region such as to provide a voltage drop during activation of the car safety device activation element. Thus, the supply voltage for the drive circuit 203 is controlled by the supply controller 217. Hence, in contrast to the circuit of FIG. 1, the supply FET 215 is not fully switched on to provide a low resistance with an insignificant voltage drop but is rather driven into the active region whereby a substantial voltage drop over the supply FET 215 is achieved.

In a simple embodiment, the supply FET 215 may be controlled to provide a substantially constant supply voltage for the drive circuit. In a simple embodiment, the supply controller 217 may for example set the gate voltage of the supply FET 215 to a substantially constant value. For example, if a gate source voltage of 3V corresponds to a drain source current of around 2 A in the active region, the gate voltage may be set at a fixed level of 15V resulting in a source voltage of around 12V. Thus a significant voltage drop occurs from drain to source of the supply FET 215 rather than over the high side FET 205.

In the described embodiment, the supply FET 215 is thus controlled to reduce the voltage at the input to the drive circuit. Accordingly, the power absorption in the drive circuit is substantially reduced in comparison to the prior art arrangement of FIG. 1. In the specific example, assuming the voltage drop over the squib 201 is 2V and the voltage drop over the low side FET 207 is 2V, the voltage drop across the high side FET 205 is reduced from around 32V (ignoring the voltage drop of any blocking components) to around 8V corresponding to a reduction of the energy to be dissipated from 128 mJ to 32 mJ (assuming an activation pulse of 2 A for 2 msec and negligible capacitor voltage change). Hence, in the embodiment, the energy dissipation of the high side FET 205 is reduced by a factor of four.

The drive circuit is in the described embodiment implemented in a single ASIC. For the high side FET 205, the physical dimension is driven by the required capacity for absorbing the generated heat energy during the activation without resulting in a thermal shutdown. A thermal shutdown typically occurs at a temperature of around 300° C.-400° C. For silicon technologies, the shutdown temperature is relatively independent of the technology used and the smaller dimensions of more advanced technologies can therefore not be fully exploited by the design.

Furthermore, as the high side FET 205 is the component of the drive circuit 203 which typically generates the largest heat energy, the size of the high side FET 205 is typically a limiting factor when designing the ASIC. Accordingly, a reduction of the energy dissipation of the high side FET 205 provides substantial advantages and may in particular provide for a higher integration. For example, the significant size reduction may result in significant amounts of additional circuitry being included in the same ASIC thus providing for increased functionality and reduced overall cost. Furthermore, the reduced power dissipation may increase the overall reliability of the drive circuit 203.

As an example, the length of the circumference of the high side FET 205 will approximately be proportional to the required energy absorption. Therefore, a reduction of the dissipated energy by a power of four will result in the size of the high side FET 205 being reduced by a large degree and the reduction in area may even exceed the reduction in dissipated energy. In a typical conventional drive circuit, the high side FET 205 may account for around 60% of the total semiconductor area. Reducing this by a factor of four results in only 15% of the area being taken up by the high side FET 205 leaving an additional 45% for additional circuitry. In this example, the area available for e.g. various control circuitry is more than doubled thereby allowing for the ASIC to potentially comprise more than twice the functionality of a conventional ASIC.

Figure 1:
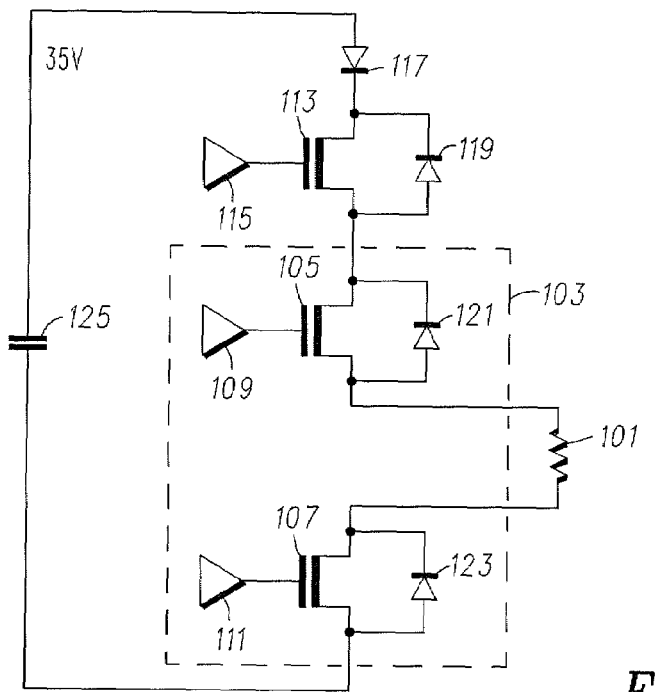
FIG. 1 illustrates a simplified air bag activation circuit in accordance with prior art.

In comparison to the circuit of FIG. 1, the control of the supply FET 215 to provide a significant voltage drop by being operated in the active region results in a significant shift of the power dissipation from the high side FET 205 to the supply FET 215. Accordingly, the power requirements for the supply FET 215 will typically be stricter for the current embodiment than for the circuit of FIG. 1. However, the supply FET 215 is preferably implemented in a less critical technology where the increased power requirement is of less significance. Specifically, for a discrete FET, the increased power requirement may easily be taken into account and can typically be met by the same FET as used in the circuit of FIG. 1.

In the described example, the voltage drop over the supply FET 215 was around two thirds of the capacitor voltage when fully charged. It will be appreciated that the circuit may be designed to provide any suitable voltage drop over the supply FET 215. Preferably, the voltage drop is such that during the activation pulse, the energy dissipated in the supply FET 215 exceeds that dissipated in the drive circuit and in particular in the high side FET 205. Thus, preferably the majority of the energy is dissipated in the supply FET 215 rather than in the high side FET 205.

As the capacitor is discharged, the voltage over of the capacity reduces. However, the supply voltage may remain relatively constant until a stage where the supply FET 215 enters the non-saturated resistive operating region. Preferably the voltage drop is significant at the initiation of the activation. Specifically, the voltage drop of the supply FET 215 preferably exceeds at least half the supply voltage of the capacitor in order to provide a substantial dissipation of energy in the supply FET 215 rather than in the high side FET 205.

Preferably, the design is such that the supply FET 215 remains in the active region at least until the squib 201 fires. However, in some embodiments, the voltage drop over the supply FET 215 is not significant for the whole duration of the activation pulse. However, in order to allow for a significant energy dissipation, the voltage drop preferably exceeds half the supply voltage of the drive circuit 203 for more than a quarter of a time interval from initiation of the activation signal to an activation of the drive circuit occurs. In particular, the voltage drop is preferably at least 5V for a duration of at least 0.5 msec of the activation pulse.

Preferably the supply FET 215 not only provides the regulation of the supply voltage to the drive circuit 203 but also acts as a safing switch. In the described embodiment, separate redundant circuits are used for the drive circuit and the supply FET 215 in determining if an activation of the air bag is required. Specifically, the supply FET 215 is controlled by a separate microcontroller to that controlling the activation of the drive circuit 203. The separate microcontroller executes separate and preferably different crash detection algorithms preferably based on separate sensor inputs. The air bag is fired when both microcontrollers independently determines that a crash detection occurs. The safing switch thereby provides additional redundancy effectively preventing that a single point failure results in an erroneous activation of the air bag.

In the described embodiment, a single transistor is thus used for two different purposes namely for regulating (specifically reducing) a supply voltage to the drive circuit and for providing additional failure mitigation. The complexity of the circuit is therefore kept low and in particular no complexity increase is required with respect to the circuit of FIG. 1.

In some embodiments, the combined safing and supply FET 215 is coupled to an external connection allowing drive circuits to be connected to it. This provides enhanced design freedom for the board design and allows high flexibility and in particular allows any suitable number of drive circuits to be connected to the same external connection thereby sharing the same safing and supply FET 215.

It will be appreciated that the control of the supply voltage of the drive circuit may correspond to providing a more stable and less varying supply voltage but that this is not essential. Rather in some embodiments it may be desirable to dynamically control the voltage drop over the supply FET 215 during the activation of the squib 201. The control may be an active control in order to provide a desired supply voltage variation during the activation or may be a passive control where the supply voltage varies due to the variation of other parameters, such as for example the voltage variation over the capacitor as this discharges.

In particular, the supply FET 215 may be controlled in response to the activation current of the squib 201. For example, the squib 201 current may be measured and if this falls below a given threshold, the supply voltage may be increased to enable a higher current through the high side FET 205.

In the embodiment of FIG. 2, the supply FET 215 is coupled to the capacitor 213 through the blocking FET 219. The blocking FET 219 is mounted in a reverse configuration to the supply FET 215 such that the drain of the supply FET 215 is connected to the drain of the blocking FET 219. Specifically, in the specific embodiment, the blocking FET 219 is implemented on the same semiconductor as the supply FET 215 with the two FETs having a common drain. Accordingly, the parasitic diode 221 of the blocking FET 219 is in the opposite direction of the parasitic diode 223 of the supply FET 215. Therefore, the parasitic diode 221 prevents any current flowing through the parasitic diode 223 of the supply FET 215. In other words, the parasitic diode 221 provides the same blocking effect as the blocking diode 117 of the circuit of FIG. 1.

However, during an activation of the air bag, the activation current is not carried through the parasitic diode 221. Rather, the blocking FET 219 is switched fully on and the activation current is conducted through the FET rather than the parasitic diode 221. Specifically, the gate of the blocking FET 219 may be fed the capacitor voltage thereby driving the blocking FET 219 into the non-saturated operating mode. In this mode, the blocking FET 219 presents a very low resistive value resulting in a reduced voltage drop.

For example, assuming that a combined current of 10 A must be conducted during activation of multiple air bags. A blocking diode carrying this large current will typically have a large voltage drop of typically around 1.2V. However, the effective resistance of the blocking FET 219 in the non-saturated mode may be 50 mΩ resulting in a total voltage drop of only 0.50V.

The reduced voltage drop over the blocking component may reduce the power consumption and dissipation. Furthermore, it may allow a reduced capacitance of the capacitor. Since the energy stored in the capacitor is proportional to the square of the charged voltage, even a relatively small reduction in the voltage may result in a significant increase of the stored energy thus reducing the requirement for the capacitance resulting in a significantly smaller and cheaper capacitor.

Thus, using the blocking FET 219 in the non-saturated ($R_{DS,ON}$) mode may result in a reduced voltage drop which is particularly advantageous when the capacitor voltage becomes relatively low (such as when it falls to around 8-9V). However, it will be appreciated that it is not essential to conduct the current through the blocking FET 219 in a non-saturated mode but that for example an opened diode configuration may be used instead.

Furthermore, the blocking FET 219 may typically be simpler to implement than the blocking diode 117 of FIG. 1. Preferably, the blocking FET 219 and the supply FET 215 are integrally formed on the same semiconductor substrate with a shared drain. Thus, the combined functionality of the blocking FET 219 and the supply FET 215 may be achieved with little additional cost over that of each of the FETs individually.

Figure 3:
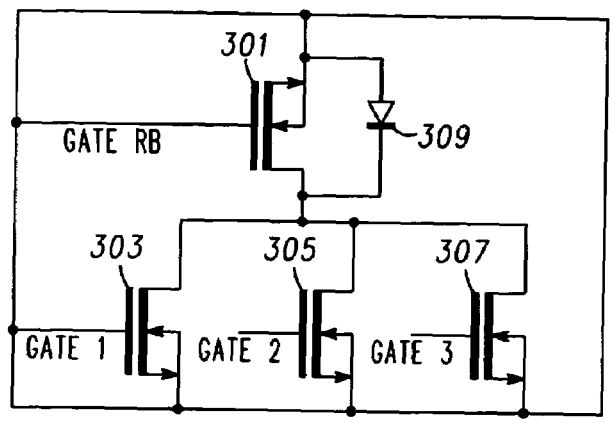
FIG. 3 illustrates an example of a voltage supply arrangement for a plurality of drive circuits in accordance with an embodiment of the invention.

The blocking FET 219 is preferably common for a plurality of supply FETs. FIG. 3 illustrates an example of a voltage supply arrangement for a plurality of drive circuits in accordance with an embodiment of the invention. In the example, a blocking FET 301 has common drain with three supply FETs 303, 305, 307. The four FETs are implemented on the same semiconductor substrate. The parasitic diode 309 of blocking FET 301 provides a blocking effect in the same way as described above with reference to FIG. 2.

In operation, the source of the blocking FET 301 is coupled to the energy reservoir such as a capacitor. The source of each individual supply FET 303, 305, 307 is coupled to a drive circuit for a car safety device activation element. For example, the source of the first supply FET 303 may be coupled to a drive circuit for a driver air bag, the source of the second supply FET 305 may be coupled to a drive circuit for a passenger air bag, and the source of the third supply FET 305 may be coupled to a drive circuit for a seat belt pretensioner. The gate of each of the blocking FET 301 and supply FETs 303, 305, 305 are attached to connectors for connection to suitable control circuits. Thus each of the supply FETs 303, 305, 305 may be individually controlled to provide preferably both a voltage regulating and a safing switch function. Hence, a simple, low cost and efficient arrangement for providing a supply voltage for a drive circuit may be provided. Furthermore, as the components may be integrated on the same semiconductor substrate, an overall size reduction may be achieved and the need for separate (possibly discrete) components is avoided.

The individual supply FETs 303, 305, 307 may be dimensioned to match the required performance for each drive circuit and/or car safety device. For example, the squibs activated by the first and second supply FETs 303, 305 may require twice the current of the seat belt pretensioner squib activated by the supply FET 307. Accordingly, the first and second supply FETs 303, 305 may be made twice as big as the third supply FET 307.

Preferably the supply FET 215 and/or the blocking FET 219 is integrated in the same package as the drive circuit 201. In particular, an ASIC comprising the drive circuit 203 also comprises a supply voltage arrangement comprising the supply FET 215 and preferably the blocking FET 219. The supply voltage arrangement may comprise additional components such as supply FETs for other drive circuits (which may also be comprised in the ASIC). Specifically, the supply voltage arrangement may correspond to the supply voltage arrangement illustrated in FIG. 3.

In the following, an embodiment of an integrated circuit comprising both a drive circuit and a supply voltage arrangement will be described. In the embodiment, the drive circuit and the supply voltage arrangement are implemented on separate dies within the same package.

Figure 4:
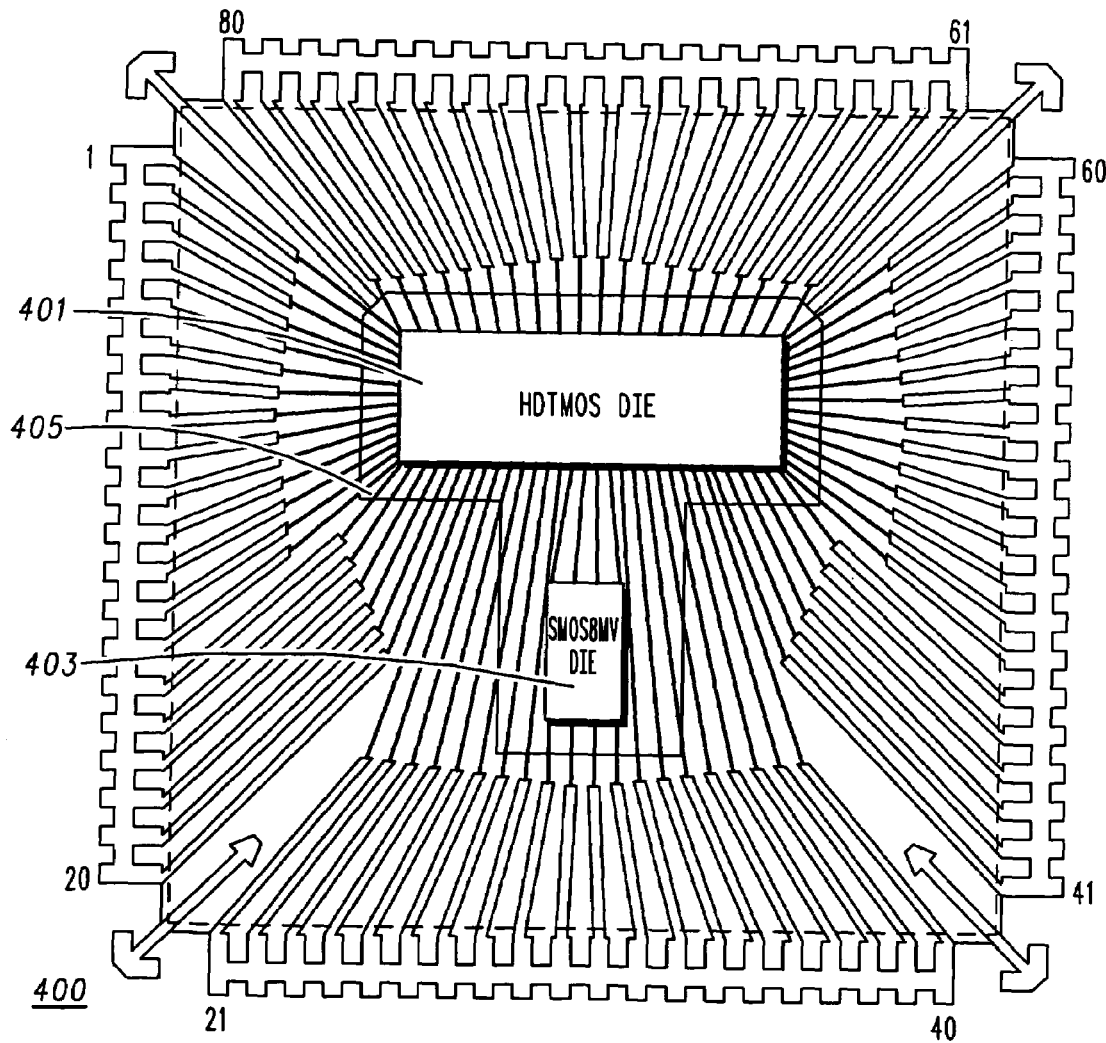
FIG. 4 is an illustration of an integrated circuit comprising a drive circuit and an supply voltage arrangement in accordance with an embodiment of the invention.

FIG. 4 is an illustration of an integrated circuit comprising a drive circuit and an supply voltage arrangement in accordance with an embodiment of the invention.

The ASIC 400 comprises a first die 401 which implements the functionality of the drive circuit. The die may further comprise other circuitry such as control circuitry e.g. for controlling the drive circuit. In addition the ASIC 400 comprises a second die 403 which implements the supply voltage arrangement.

An advantage of implementing the drive circuit and the supply voltage arrangement on separate dies is that different technologies can be used in implementing each circuit. Thus, the first die may be optimised for the requirements and characteristics of the drive circuit whereas the second die may be optimised for the requirements and characteristics of the supply voltage arrangement.

Specifically, the first die may utilise a more advanced technology than the second die. The first die may use a technology which is relatively expensive to manufacture but which allows low dimensions and thus high integration. For example, the first die may be implemented using a Motorola™ SMARTMOS™ technology such as SMOS7MV which allows design dimensions of around 0.25 μm.

In contrast, the second die is preferably implemented using a simpler and cheaper technology such as a vertical MOSFET technology like for example an HDTMOS technology.

Thus, the advantages of the SMARTMOS™ technology may be used to provide high integration and additional functionality whereas the cheaper HDTMOS technology may be used for the supply voltage arrangement which cannot take advantage of the potential lower dimensions due to the energy dissipation requirement. Hence, in the ASIC, the majority of energy dissipation is accomplished by the cheapest and most robust technology whereas the logic and control circuitry is implemented in a more advanced technology.

In the ASIC 400 of FIG. 4, the first and second dies 401, 403 are mounted on a common support element 405. Preferably the first and second die 401, 403 are electrically isolated from each other. Specifically, in the arrangement of FIG. 4, it can be seen that the common drain, which is typically formed by the substrate of the second die, is at a high voltage potential during activation. Specifically, the voltage potential may be around 35V at the outset of the activation pulse.

However, the substrate of the first die in which the drive circuit and logic circuits are formed is maintained at a ground level. Therefore, the substrates must be isolated from each other in this embodiment.

The isolation may in some embodiments be achieved by the sue of a common support element which includes isolation means between the first die and the second die. In particular, the common support element may itself be of an isolating material, and the first and second die may be adhered to this common support element.

Alternatively or additionally, the first and/or second die may be attached to the common support element using isolating glue. This may be particularly suitable for embodiments where the potential voltage differential between the first and second die is relatively low. In one such embodiment, the common support element may be formed by the substrate of the first (or second) die and the second (or first) die may be glued onto the substrate of the first (or second) die using isolating glue.

In some embodiments, different car safety devices may be fed by different energy supplies. In particular, some safety devices, such as air bags, may be fed from a locally placed capacitor whereas other less critical safety devices, such as seat belt pre-tensioners, may be fed from the car battery. In this case, the available voltage levels for different safety devices may vary significantly. For example, the capacitor may be charged to a voltage of 35V whereas the car battery voltage may be in the range from 14V to 18V. In this case, drive circuits used with the capacitor energy resource are preferably fed through a blocking FET and a supply FET as previously described. However, drive circuits fed from the battery may be fed directly due to the reduced voltage levels of the battery. Accordingly, the drive circuit of an ASIC is preferably designed to operate either directly connected to a battery or coupled to a capacitor through a supply voltage arrangement as previously described.

As the battery voltage may be slightly higher than the regulated voltage from the supply voltage arrangement, this may require that the high side FET of the drive circuit is increased in size but this may be an acceptable trade-off in many embodiments in view of the enhanced compatibility of the drive circuit for different applications. Thus the same ASIC may be used both for capacitor driven and battery driven safety devices.

The above description has referred to an active region and a non-saturated region of a FET. It will be appreciated that the corresponding regions of a bipolar transistor may be equally applicable. For example, the non-saturated region of a FET may correspond to the saturated region of a bipolar transistor. Similar, the active region for the FET may correspond to the active or normal operating region for a bipolar transistor.

The invention, or at least embodiments thereof, tend to provide one or more following advantages, singly or in combination:

(i) The energy dissipation of a car safety device drive arrangement may be moved to cheaper, more robust technology and/or to external components.

(ii) The number of external components may be reduced.

(iii) An improved blocking arrangement with reduced power dissipation during activation of the car safety device may be achieved.

(iv) A higher integration may be achieved.

(v) The cost of the car safety device drive arrangement may be reduced.

The invention can be implemented in any suitable form. The elements and components of an embodiment of the invention may be physically, functionally and logically implemented in any suitable way. Indeed the functionality may be implemented in a single unit, in a plurality of units or as part of other functional units.

Whilst the specific and preferred implementations of the embodiments of the present invention are described above, it is clear that one skilled in the art could readily apply variations and modifications of such inventive concepts.

Thus, the scope of the present invention is limited only by the accompanying claims. In the claims, the term comprising does not exclude the presence of other elements or steps.

What is claimed is:

1. A drive arrangement for activating a car safety device activation element, the drive arrangement comprising:
    a drive circuit for coupling to the car safety device activation element and operable to generate an activation signal for activating the car safety device;
    a power supply transistor coupled in series with a power supply input of the drive circuit;
    control means for controlling the supply voltage for the drive circuit by controlling the power supply transistor to operate in an active region to provide a voltage drop during activation of the car safety device activation element; and
    a reverse blocking switch transistor in series with the power supply transistor.

2. The drive arrangement according to claim 1, wherein the drive circuit comprises current limiting means limiting a current for the car safety device activation element during activation of the car safety device activation element.

3. The drive arrangement according to claim 1, wherein the drive circuit comprises a first drive transistor in series with the power supply input and a first output for coupling to the car safety device activation element.

4. The drive arrangement according to claim 3, wherein the drive circuit comprises a second drive transistor in series with a second output for coupling to the car safety device activation element.

5. The drive arrangement according to claim 1, wherein the control means is operable to control the supply transistor such that the voltage drop exceeds half the supply voltage for more than a quarter of a time interval from initiation of the activation signal to an activation of the car safety device activation element.

6. The drive arrangement according to claim 1, wherein the control means is operable to control the power supply transistor such that an energy dissipated in the power supply transistor during activation exceeds an energy dissipated in the drive circuit during activation.

7. The drive arrangement according to claim 1, wherein the control means is operable to dynamically control the voltage drop during activation of the car safety device activation element.

8. The drive arrangement according to claim 1, wherein the control means is operable to control the voltage drop in response to an activation current of the car safety device activation element.

9. The drive arrangement according to claim 1, wherein the reverse blocking switch transistor is common to a plurality of safing transistors.

10. An integrated circuit comprising a drive arrangement for activating a car safety device activation element, the drive arrangement comprising:
    a drive circuit for coupling to the car safety device activation element and operable to generate an activation signal for activating the car safety device;
    a power supply transistor coupled in series with a power supply input of the drive circuit;
    control means for controlling the supply voltage for the drive circuit by controlling the power supply transistor to operate in an active region to provide a voltage drop during activation of the car safety device activation element; and
    a reverse blocking switch transistor in series with the power supply transistor.

11. The integrated circuit according to claim 10, wherein the power supply transistor is disposed on a first die and the drive circuit is disposed on a second die.

12. The integrated circuit according to claim 11, wherein the first die and the second die are mounted on a common support element.

13. The integrated circuit according to claim 12, wherein the common support element includes isolation means between the first die and the second die.

14. The integrated circuit according to claim 12, wherein at least one of the first die and the second die is attached to the common support element by isolating glue.

15. The integrated circuit according to claim 11, wherein the first die comprises a plurality of safing transistors.

16. The integrated circuit according to claim 15, wherein the plurality of safing transistors have a common drain and a separate source for coupling to different car safety device activation elements.

17. The integrated circuit according to claim 11, wherein the first die comprises a reverse blocking switch transistor.

18. The integrated circuit according to claim 17, wherein a drain of the reverse blocking switch transistor is connected to a common drain of a plurality of safing transistors.

19. The integrated circuit according to claim 10, wherein the power supply transistor is formed in accordance with a first semiconductor technology and the drive circuit is at least partly formed in accordance with a different semiconductor technology.

20. A method of activating a car safety device activation element using a drive arrangement comprising a drive circuit for coupling to the car safety device activation element and operable to generate an activation signal for activating the car safety device, a power supply transistor coupled in series with a power supply input of the drive circuit, and a reverse blocking switch transistor in series with the power supply transistor, the method comprising the step of:
controlling a supply voltage for the drive circuit by controlling the power supply transistor to operate in an active region to provide a voltage drop during activation of the car safety device activation element.

* * * * *